(12) United States Patent
Aoyama et al.

(10) Patent No.: US 7,965,001 B2
(45) Date of Patent: Jun. 21, 2011

(54) DRIVE CONTROL DEVICE FOR OSCILLATOR, DRIVE CONTROL METHOD FOR OCILLATOR, AND MANUFACTURING METHOD FOR OSCILLATOR

(75) Inventors: Yoshitaka Aoyama, Sakai (JP); Shoji Aoyama, Sakai (JP)

(73) Assignee: Yoshitaka Aoyama, Osaka (JP)

( * ) Notice: Subject to any disclaimer, the term of this patent is extended or adjusted under 35 U.S.C. 154(b) by 0 days.

(21) Appl. No.: 12/993,959

(22) PCT Filed: Jul. 30, 2008

(86) PCT No.: PCT/JP2008/063684

§ 371 (c)(1), (2), (4) Date: Nov. 22, 2010

(87) PCT Pub. No.: WO2009/144836

PCT Pub. Date: Dec. 3, 2009

(65) Prior Publication Data

US 2011/0080227 A1 Apr. 7, 2011

(30) Foreign Application Priority Data

May 30, 2008 (JP) .................. 2008-142368

(51) Int. Cl.
*B06B 1/04* (2006.01)

(52) U.S. Cl. ............. 310/36; 198/762; 73/668; 331/186

(58) Field of Classification Search .............. 73/668; 331/186; 198/762; 310/36
See application file for complete search history.

(56) References Cited

U.S. PATENT DOCUMENTS

| 5,341,307 | A | * | 8/1994 | Myhre et al. | 700/240 |
| 5,472,079 | A | | 12/1995 | Yagi et al. | |
| 6,116,408 | A | * | 9/2000 | Pounds | 198/769 |
| 6,471,040 | B1 | * | 10/2002 | Baird | 198/609 |
| 6,753,640 | B2 | * | 6/2004 | Kato et al. | 310/310 |
| 2008/0072619 | A1 | * | 3/2008 | Nojima et al. | 62/498 |

FOREIGN PATENT DOCUMENTS

| EP | 0 629 568 | 12/1994 |
| JP | 7-60187 | 3/1995 |
| JP | 10-207511 | 8/1998 |
| JP | 2001-215848 | 8/2001 |
| JP | 2002-292337 | 10/2002 |

OTHER PUBLICATIONS

International Preliminary Report on Patentability and Written Opinion of the International Searching Authority issued Jan. 20, 2011 in International (PCT) Application No. PCT/JP2008/063684.
International Search Report issued Nov. 4, 2008 in International (PCT) Application No. PCT/JP2008/063684.
Japanese Notification of Reasons for Refusal dated Mar. 16, 2009 in Japanese Patent Application No. 2008-142368 w/English translation.

* cited by examiner

*Primary Examiner* — Joseph Chang
(74) *Attorney, Agent, or Firm* — Wenderoth, Lind & Ponack, L.L.P.

(57) ABSTRACT

To drive an oscillator always at a stable and constant oscillation even if frequency and amplitude of a power supply voltage differ depending on a delivery destination of the oscillator, an oscillator drive control device (10), which generates a predetermined switching pattern by operating a switching element, and supplies an oscillation generation unit (7) of the oscillator with drive electric power for generating predetermined oscillation frequency and amplitude according to the switching pattern, includes: a voltage detection circuit (11) for detecting a power supply voltage unique to a delivery destination of the oscillator; a memory circuit (12) storing, in advance, a basic switching pattern adapted to an arbitrarily set reference voltage, and used for driving the oscillation generation unit (7) at proper oscillation frequency and amplitude; and an arithmetic processing circuit (13) for calculating a ratio of the detected voltage unique to the delivery destination detected by the voltage detection circuit (11) to the reference voltage, and calculating, based on the ratio, a switching pattern substantially the same as the basic switching pattern under an environment of the power supply voltage unique to the delivery destination.

20 Claims, 6 Drawing Sheets

AC95V 75Hz
EFFECTIVE VALUE $t_1$ $t_3$ $t_5$ $t_7$ $t_9$ $t_{11}$ $t_{13}$ $t_{15}$
$t_2$ $t_4$ $t_6$ $t_8$ $t_{10}$ $t_{12}$ $t_{14}$

DRIVE CONTROL DEVICE FOR OSCILLATOR, DRIVE CONTROL METHOD FOR OCILLATOR, AND MANUFACTURING METHOD FOR OSCILLATOR

TECHNICAL FIELD

The present invention relates to a drive control device for an oscillator, a drive control method for an oscillator, and a manufacturing method for an oscillator. An oscillator is generally configured to obtain an oscillation by means of an electromagnetic coil or a piezoelectric element, and the obtained oscillation needs to be set to proper oscillation characteristics according to applications, namely proper oscillation frequency and amplitude. Moreover, the oscillation obtained in this way is used in various devices for providing oscillations.

Those various devices include a part feeder for feeding parts stored in a circular bowl, a vibratory hopper for supplying the bowl of the part feeder with the parts by vibrating a part feeder plate provided in a tilted manner to a part container in a rectangular box shape, a linear feeder for linearly feeding parts, and a device for grinding a part by oscillating a container containing a large number of parts.

BACKGROUND ART

Typical examples of the applications of the oscillator as mentioned above include an electromagnetic vibratory part feeder using oscillations generated by an electromagnetic coil, for example. The part feeders of this kind include a part feeder provided with a circular bowl in which a part-transport path in a spiral shape is formed, and which stores parts such as projection nuts (refer to Patent Literature 1, for example).

The circular bowl of the vibratory part feeder of this kind has a part-transport path in a spiral shape formed along an internal wall surface. An attracted portion fixed on a back surface of a bottom portion of the bowl is supported by top ends of a plurality of spring members, and bottom ends of the plurality of spring members are fixed at a predetermined inclined angle to a base member in a stationary state. An electromagnetic coil is provided on the base member, and the attracted portion is intermittently attracted by turning ON/OFF of power supply to the electromagnetic coil, thereby imparting a composed oscillation in a circumferential direction and a vertical direction to the bowl. As a result, a large number of parts fed to the bottom portion of the bowl are sequentially transported in an aligned state along the part-transport path, and are fed out from a feed-out tube on a top end portion of the bowl.

The vibratory part feeder disclosed in Patent Literature 1 provides control of always maintaining a constant amplitude of the part feeder within a drive circuit without providing a special detector for detecting an oscillation state to a main unit of the part feeder in response to a change in weight of the parts in the bowl caused by the feed-out of the parts, or a slight variation in power supply voltage caused by electric power used in a plant.

In other words, the vibratory part feeder is configured to detect, by current detection means, a current flowing through the electromagnetic coil, decompose, by higher harmonic analysis means, the detected current into higher harmonic components, compare and calculate, by oscillation calculation means, a high-order current signal based on an oscillation of a mechanical system out of the higher harmonic components and a set current signal set in advance for generating a predetermined amplitude, and control a drive current of a drive power supply according to the calculated result so that a detected current value and a set current value coincide with each other.

The vibratory part feeder disclosed in Patent Literature 1 uses the current, particularly, a correlation between the current component of the higher harmonic based on the mechanical system of the part feeder and the amplitude. Therefore, the entire processing is carried out by the electronic circuit in a control device without providing a special detector to the main unit of the part feeder, thereby providing an appropriate feedback control of the amplitude following a variation in the part weight or the like.

CITATION LIST

Patent Literature 1: JP 07-60187 A

SUMMARY OF INVENTION

Technical Problem

However, it is necessary for each vibratory part feeder of this kind to be adjusted for generating a stable constant oscillation in response not only to a change in weight of the parts in the bowl caused by the feed-out of the parts, and a slight variation in power supply voltage caused by electric power used in a plant mentioned above, but also to changes in frequency and amplitude of the power supply voltage which are different depending on a delivery destination of the vibratory part feeder (location where the vibratory part feeder is installed) which has unique frequency and amplitude of the power supply.

If the constant oscillation cannot be maintained, the number of fed parts per predetermined period varies, and normal continuity to a subsequent electric resistance welding process and the like cannot be secured, resulting in a trouble in a production management.

As an AC power supply unique to the delivery destination mentioned above, while an electric power supply having two types of frequency, 50 Hz and 60 Hz, and two types of amplitude, 100 V and 200 V, are used in Japan, for example, an electric power supply having a frequency of 50 Hz and two types of amplitude, 115 V and 230 V is used in Europe or other part of the world, for example. The actual condition is that the frequency and the amplitude of the power supply used for driving the vibratory part feeder vary depending on domestic and overseas delivery destinations as described above.

As described above, those delivery destinations are different in frequency and amplitude of the power supply, and hence if the vibratory part feeder which has been adjusted upon the factory delivery or the like is installed in the delivery destination, it is necessary to readjust the frequency (oscillation frequency) and the amplitude of the output voltage of a drive control device so that a drive system of the vibratory part feeder is driven at a stable and constant oscillation according to the unique power supply voltage used at the delivery destination.

In response to a change in weight of the parts in the bowl caused by the feed-out of the parts, or a slight variation in power supply voltage caused by the electric power used in the plant as mentioned above, the part feeder may be adjusted by using the correlation between the current component of the higher harmonic based on the mechanical system of the part feeder and the amplitude as disclosed in Patent Literature 1. In other words, the frequency and the amplitude of the output voltage of the drive control device need to be finely adjusted in response to the change in weight of the parts in the bowl, and the slight variation in power supply voltage caused by the electric power used in the plant.

However, it is difficult to adapt to a situation of the power supply voltage unique to the delivery destination of the vibratory part feeder, which widely ranges from 100 V to 230 V, for example, only by finely adjusting the frequency and the amplitude of the output voltage of the drive control device as the vibratory part feeder disclosed in Patent Literature 1, and it is necessary to largely adjust the frequency and the amplitude of the output voltage of the drive control device.

Moreover, if the adaptation is difficult to be achieved only by adjusting the frequency and the amplitude of the output voltage of the drive control device, the electromagnetic coil and the spring members need to be replaced, but the replacement of the electromagnetic coil and spring members requires experience and time, which causes a decrease in work efficiency, resulting in difficulty in quick adaptation.

The present invention is made in view of the above-mentioned problems, and has an object of providing a drive control device for an oscillator, a drive control method for an oscillator, and a manufacturing method for an oscillator capable of adapting to unique power supply voltages having different frequencies and amplitudes so as to drive an oscillator always at a stable and constant oscillation even if the frequency and the amplitude of the power supply voltage differ depending on the delivery destination of the oscillator and the range of change in the power supply voltage in the delivery destination is wide.

Moreover, there are examples in which the oscillation frequency of the vibratory part feeder is set to 50 times or 60 times per second based on the frequency of the commercial power supply (50 Hz and 60 Hz in Japan), which are not mentioned in Patent Literature 1. However, if there are fixed two types of frequency, it is impossible to flexibly adapt to changes in mass of an oscillating portion (bowl) of the vibratory part feeder and parts. In other words, the vibratory part feeder needs to have a specification proper for 50 or 60 times of oscillations per second, and there thus poses a problem of a decreased degree of freedom in terms of design.

Solution to Problem

As an aspect of the present invention to attain the above-mentioned object, according to claim 1 of the present invention, there is provided a drive control device for an oscillator, which generates a predetermined switching pattern by operating a switching element, and supplies an oscillation generation unit of an oscillator with drive electric power for generating predetermined oscillation frequency and amplitude according to the switching pattern, the oscillator drive control device at least including: a voltage detection circuit for detecting a power supply voltage unique to a delivery destination of the oscillator; a memory circuit storing, in advance, a basic switching pattern adapted to an arbitrarily set reference voltage, and used for driving the oscillation generation unit at proper oscillation frequency and amplitude; and an arithmetic processing circuit for calculating a ratio of the detected voltage unique to the delivery destination detected by the voltage detection circuit to the reference voltage, and calculating, based on the ratio, a switching pattern substantially the same as the basic switching pattern under an environment of the power supply voltage unique to the delivery destination. It should be noted that "delivery destination" refers to a region in which the oscillator is to be installed. It should be noted that "power supply voltage unique to the delivery destination" refers to power supply voltage unique to the plant in which the oscillator is to be installed.

The drive control device for the oscillator according to the present invention includes, as a main portion, the voltage detection circuit, the memory circuit, and the arithmetic processing circuit that are described above, and hence a constant oscillation can always be generated by the oscillation generation unit of the oscillator according to the power supply voltage having the amplitude unique to the delivery destination at which the oscillator is to be installed.

In other words, the power supply voltage unique to the delivery destination at which the oscillator is to be installed is detected by the voltage detection circuit, the ratio of the detected voltage output from the voltage detection circuit to the reference voltage set arbitrarily is calculated by the arithmetic processing circuit, the basic switching pattern proper for the oscillator in a case where the switching element is driven at the reference voltage is read out from the memory circuit, and the switching pattern substantially the same as the basic switching pattern under the environment of the power supply voltage unique to the delivery destination is calculated based on the ratio described above by the arithmetic processing circuit.

As a result, an output voltage of the drive control device generated by a switching operation of the switching element is made coincident with an output voltage in the case where the switching element is driven at the reference voltage, even under the environment of the power supply voltage at the delivery destination. In other words, the mechanical oscillation frequency and amplitude of the oscillator are always set to predetermined constant values even for the power supply voltage varying depending on the delivery destination, a uniform operation is automatically obtained in a vibratory part feeder, a vibratory linear part feeder, or a vibratory part grinding device without special adjustments at the delivery destination.

As a result, even if the voltage range of a plurality of types of power supply voltage different in frequency and amplitude depending on the delivery destination at which the oscillator is to be installed is a range with a wide variation such as 100 V, 115 V, 200 V, and 230 V, the output voltage of the drive control device can always be constant, thereby causing the oscillation generation unit of the oscillator to always generate a constant oscillation, and an optimal oscillation can be imparted in a case where the oscillator is applied to a part-transport unit or the like. A proper adaptation through the arithmetic processing is performed for a slight variation in power supply voltage caused depending on the electric power usage in a plant, and the constant oscillation can always be generated.

According to claim 2 of the present invention, provided is the drive control device for the oscillator according to claim 1, in which the reference voltage is selected from a plurality of the power supply voltages unique to the delivery destination. In this way, the reference voltage can be arbitrarily selected from the plurality of the power supply voltages unique to the delivery destination.

According to claim 3 of the present invention, provided is the drive control device for the oscillator according to claim 1 or 2, in which the basic switching pattern is set in a production process of the oscillator drive control device. In this way, the basic switching pattern can be set by storing the basic switching pattern in the memory circuit in advance in the production process of the drive control device.

According to claim 4 of the present invention, provided is the drive control device for the oscillator according to any one of claims 1 to 3, in which the calculation of the switching pattern by the arithmetic processing circuit is carried out by multiplying a pulse width, which represents ON/OFF timings of the basic switching pattern, by an inverse of the ratio of the detected voltage to the reference voltage. As a result of the calculation of the switching pattern, the output voltage of the drive control device generated by the switching operation of the switching element can be coincident with the output voltage in the case where the switching element is driven at the reference voltage even under the environment of the power supply voltage of the delivery destination.

According to claim 5 of the present invention, provided is the drive control device for the oscillator according to any one of claims 1 to 4, in which the oscillation generation unit of the oscillator includes an electromagnetic coil. In this case, the oscillation is to be generated by the oscillator by supplying the electromagnetic coil with the electric power.

According to claim 6 of the present invention, provided is the drive control device for the oscillator according to claim 5, in which the electromagnetic coil is intermittently driven by repeating an applied wave generated by applying a half-wave voltage and a counter electromotive wave generated by releasing a counter electromotive force generated on the electromagnetic coil. This intermittent drive enables generation of a strong oscillation on the electromagnetic coil while the largest power saving effect is provided. This may be applied to a case where an oscillation generated by a piezoelectric element is used in addition to the case where the oscillation generated by the electromagnetic coil is used. Moreover, according to the present invention, the power supply voltage may be controlled according to any one of half-wave rectification and full-wave rectification.

If the power supply voltage is controlled particularly by the half-wave rectification, the electromagnetic coil is preferably intermittently driven by repeating the applied wave generated by applying the half-wave voltage and the counter electromotive wave generated by releasing the counter electromotive force generated on the electromagnetic coil. This can impart a stronger oscillation than oscillation in a case where the power supply voltage is controlled according to the full-wave rectification to the part-transport unit, which is effective in saving power.

According to claim 7 of the present invention, provided is the drive control device for the oscillator according to any one of claims 1 to 6, in which the oscillator is a part feeding device. The constant oscillation characteristics are always secured by the drive control device in this way, and hence a uniform oscillation transport is enabled in the part feeding device. In other words, the maintenance of the constant oscillation provides the always constant number of parts fed per predetermined unit period even if the power supply voltage changes largely as a value unique to the delivery destination, and the continuity to a subsequent electric resistance welding process or the like can be normally secured, which is preferred in terms of production management.

According to claim 8 of the present invention, provided is the drive control device for the oscillator according to claim 7, in which the part feeding device includes a part-transport path for transporting a part. The transport oscillation is imparted to the part-transport path, and the oscillation frequency and amplitude of the oscillation are always maintained constant. Even if the power supply voltage largely changes as the value unique to the delivery destination, the oscillation frequency and amplitude of the oscillation are always maintained constant, and the continuity to the subsequent electric resistance welding process or the like can be normally secured, which is preferred in terms of the production management.

According to claim 9 of the present invention, provided is the drive control device for the oscillator according to claim 8, in which the part-transport path is formed in a spiral form along an inner wall surface of a circular oscillating bowl storing the part. The proper constant transport oscillation can always be secured even if the part-transport path is formed in the spiral form.

In order to attain the above-mentioned object, as another aspect of the present invention, according to claim 10 of the present invention, provided is a manufacturing method for an oscillator drive control device for operating a switching element, thereby generating a predetermined switching pattern, and supplying an oscillation generation unit of an oscillator with drive electric power for generating predetermined oscillation frequency and amplitude according to the switching pattern, the oscillator drive control device at least including: a voltage detection circuit for detecting a power supply voltage unique to a delivery destination of the oscillator; a memory circuit storing, in advance, a basic switching pattern adapted to an arbitrarily set reference voltage, and used for driving the oscillation generation unit at proper oscillation frequency and amplitude; and an arithmetic processing circuit for calculating a ratio of the detected voltage unique to the delivery destination detected by the voltage detection circuit to the reference voltage, and calculating, based on the ratio, a switching pattern substantially the same as the basic switching pattern under an environment of the power supply voltage unique to the delivery destination, the basic switching pattern being stored in the memory circuit in a production process of the drive control device for the oscillator by basic-switching-pattern setting means. The drive control device in which the mechanical oscillation frequency and amplitude of the oscillator are always set to the predetermined constant values can be manufactured in this way even for the power supply voltage varying depending on the each delivery destination.

In order to attain the above-mentioned object, as a further aspect of the present invention, according to claim 11 of the present invention, provided is a drive control method for an oscillator of operating a switching element, thereby generating a predetermined switching pattern, and supplying an oscillation generation unit of an oscillator with drive electric power for generating predetermined oscillation frequency and amplitude according to the switching pattern, including: always monitoring, by a voltage detection circuit, a power supply voltage unique to a delivery destination of the oscillator; storing, in a memory circuit, in advance, a basic switching pattern adapted to an arbitrarily set reference voltage, and used for driving the oscillation generation unit at proper oscillation frequency and amplitude; and calculating, by an arithmetic processing circuit, a ratio of the detected voltage unique to the delivery destination detected by the voltage detection circuit to the reference voltage, and calculating, based on the ratio, a switching pattern substantially the same as the basic switching pattern under an environment of the power supply voltage unique to the delivery destination, in which the calculating, by the arithmetic processing circuit, the switching pattern includes multiplying a pulse width, which represents ON/OFF timings of the basic switching pattern, by an inverse of the ratio of the detected voltage to the reference voltage. The real time monitoring of the power supply voltage in this way secures the generation of the always constant oscillation in the oscillation generation unit of the oscillator, and thus enables quick adaptation to the variation of the power supply voltage unique to the delivery destination. The proper adaptation through the arithmetic processing is performed for the slight variation in power supply voltage caused depending on the electric power usage in a plant, and the constant oscillation can always be generated.

ADVANTAGEOUS EFFECTS OF INVENTION

According to the present invention, the drive control device includes, as the main portion, the voltage detection circuit, the memory circuit, and the arithmetic processing circuit that are described above, and hence a constant oscillation can always be generated by the oscillation generation unit of the oscillator according to a plurality of types of the power supply voltage different in the oscillation frequency or amplitude depending on the delivery destination at which the oscillator is to be installed. In other words, at whatever delivery destination the oscillator is installed, the oscillator can always be driven at the stable constant oscillation without an adjustment operation at the delivery destination, and a highly reliable and high quality oscillator can be provided.

As a result, in a case where the oscillator is installed at the delivery destination, an operation of adjusting the frequency and the amplitude of the output voltage of the control device is no longer necessary. Moreover, a replacement of parts in the oscillation generation unit is not necessary, and hence the workers are no longer required to be skilled highly. Further, the oscillator can be quickly and easily installed, resulting in a drastic increase in operation efficiency.

While the present invention is provided as the drive control device for the oscillator as described above, the present invention may be applied as a drive control method for an oscillator. The control method is "a drive control method for an oscillator, which generates a predetermined switching pattern by operating a switching element, and supplies an oscillation generation unit of an oscillator with drive electric power for generating predetermined oscillation frequency and amplitude according to the switching pattern, the drive control method for the oscillator including: always monitoring, by a voltage detection circuit, a power supply voltage unique to a delivery destination of the oscillator; storing, in a memory circuit, in advance, a basic switching pattern adapted to an arbitrarily set reference voltage, and used for driving the oscillation generation unit at proper oscillation frequency and amplitude; and calculating, by an arithmetic processing circuit, a ratio of the detected voltage unique to the delivery destination detected by the voltage detection circuit to the reference voltage, and calculating, based on the ratio, a switching pattern substantially the same as the basic switching pattern under an environment of the power supply voltage unique to the delivery destination, in which the calculating, by the arithmetic processing circuit, the switching pattern includes multiplying a pulse width, which represents ON/OFF timings of the basic switching pattern, by an inverse of the ratio of the detected voltage to the reference voltage."

Further, the present invention may be provided as a manufacturing method of a drive control device for an oscillator. The manufacturing method is "a manufacturing method of a drive control device for an oscillator for operating a switching element, thereby generating a predetermined switching pattern, and supplying an oscillation generation unit of an oscillator with drive electric power for generating predetermined oscillation frequency and amplitude according to the switching pattern, the oscillator drive control device at least including: a voltage detection circuit for detecting a power supply voltage unique to a delivery destination of the oscillator; a memory circuit storing, in advance, a basic switching pattern adapted to an arbitrarily set reference voltage, and used for driving the oscillation generation unit at proper oscillation frequency and amplitude; and an arithmetic processing circuit for calculating a ratio of the detected voltage unique to the delivery destination detected by the voltage detection circuit to the reference voltage, and calculating, based on the ratio, a switching pattern substantially the same as the basic switching pattern under an environment of the power supply voltage unique to the delivery destination, the basic switching pattern being stored in the memory circuit in a production process of the drive control device for the oscillator by basic-switching-pattern setting means."

DESCRIPTION OF EMBODIMENT

Detailed description is now given of the best mode for embodying a drive control device for an oscillator according to the present invention. Though a case of an application to an electromagnetic vibratory part feeder using an oscillation generated by an electromagnetic coil is exemplified in the following embodiment, the present invention may be applied to a vibratory part feeder using an oscillation generated by a piezoelectric element, an electromagnetic vibratory linear feeder, an electromagnetic vibratory part grinding device, and the like.

Figure 1A:
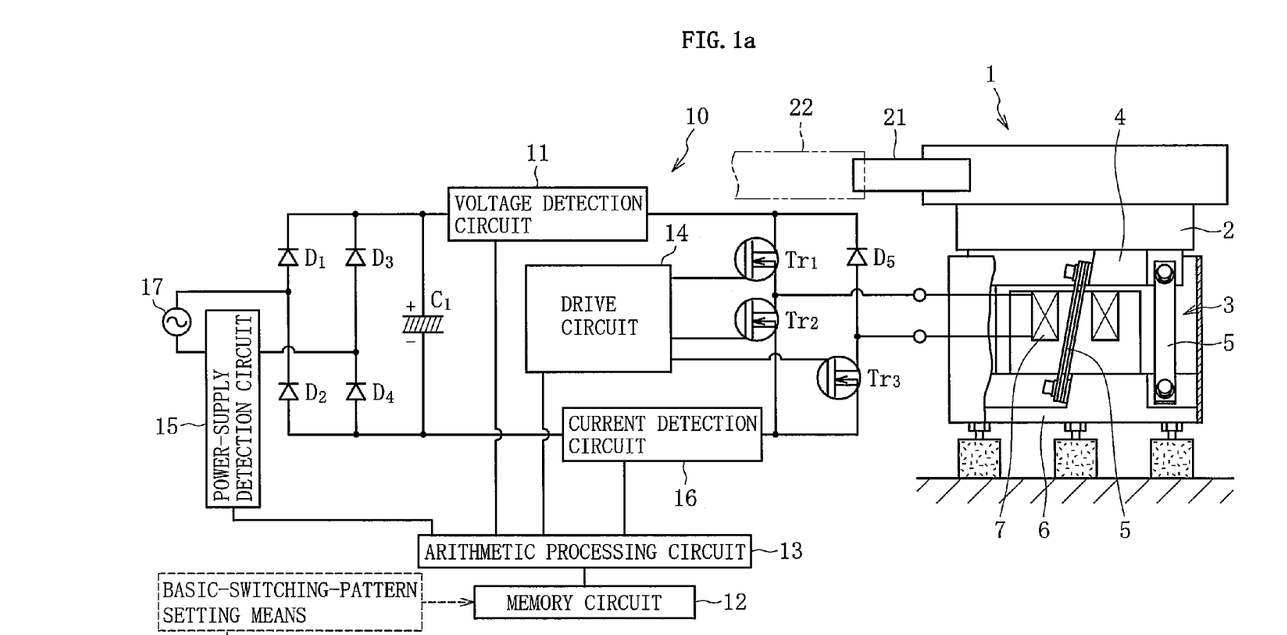
[FIG. 1a] A circuit configuration diagram illustrating a schematic configuration of a vibratory part feeder and a drive control device thereof.

FIG. 1a illustrates a schematic configuration of a vibratory part feeder 1 and a drive control device 10 therefor according to the embodiment. Parts stored in the vibratory part feeder 1 are iron projection nuts 19 as illustrated in FIG. 1d, and the projection nut is an ordinary one which has dimensions of 12 mm in length, 12 mm in width, and 5 mm in height, for example, and which includes a threaded hole 19a formed at the center, and projections for welding 19b formed at four corners on one side.

The vibratory part feeder 1 according to this embodiment includes a bowl 2 made of a steel plate. An oscillation generation unit 3 is provided on a bottom side of the circular bowl 2 on which a spiral part-transport path is formed. A spiral part-transport path 20 (refer to FIG. 1b) is formed along an inner wall surface of the bowl 2. An attracted portion 4 which is made of a magnetic material and fixed on a back surface of a bottom portion of this bowl 2 is supported by top ends of a plurality of spring members 5, and bottom ends of the plurality of spring members 5 are fixed at a predetermined inclined angle to a base member 6 in a stationary state.

An electromagnetic coil 7 is provided on the base member 6, and the attracted portion 4 is intermittently attracted by turning ON/OFF an electric power supplied to the electromagnetic coil 7, thereby imparting a composed oscillation to the bowl 2 in a circumferential direction and a vertical direction, and a large number of the parts fed to the bottom portion of the bowl 2 are sequentially transported along the part-transport path 20 in an aligned form, and are fed out from a feed-out tube 21 on a top end portion of the bowl 2. It should be noted that a gap at a predetermined interval is provided between an electromagnetic iron core of the electromagnetic coil 7 and the attracted portion 4, which is generally provided and is thus not illustrated, resulting in the above-mentioned composed oscillation.

The oscillation generation unit 3 of the vibratory part feeder 1 is thus constructed by including the base member 6, the spring members 5, the electromagnetic coil 7, and the attracted portion 4 as a unit, and is locally the electromagnetic coil 7. It should be noted that a transport slide surface of the part-transport path 20 is connected to a transport slide surface of the feed-out tube 21 as illustrated in FIG. 1b.

Figure 1B:
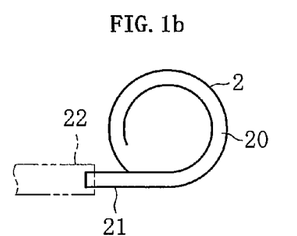

A flexible feed tube 22 made of a urethane resin or a polypropylene resin is connected to the feed-out tube 21 as illustrated by long dashed double-short dashed lines in FIGS. 1a and 1b, thereby feeding the projection nuts 19 to an electric resistance welding machine, which is a consuming device for the projection nuts 19, via a nut feeder device.

Figure 1C:
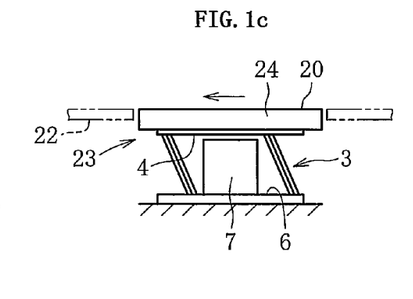
[FIG. 1c] A schematic configuration diagram illustrating an electromagnetic vibratory linear feeder.
Figure 1D:
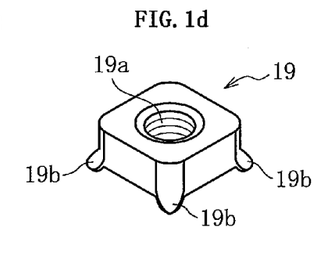
[FIG. 1d] A perspective view illustrating a projection nut which is a part.

There is an electromagnetic vibratory linear feeder 23 as a device similar to the vibratory part feeder 1 as illustrated in FIG. 1c, and this feeder also has the problem relating to the power supply voltage as mentioned above. The part-transport path 20 is formed on a linear part-transport member 29, and parts such as bolts are transported along the part-transport path 20. This transport is carried out by an oscillation as that provided by the vibratory part feeder 1. If the parts are bolts, the bolts are transported while the bolts are hanged from a head thereof. It should be noted that like components are denoted by the same numerals as those of FIGS. 1a and 1b, and are not further described.

A main portion of the drive control device 10, which controls the power supply to the electromagnetic coil 7 constituting the oscillation generation unit 3 in the vibratory part feeder 1, includes a voltage detection circuit 11, a memory circuit 12, an arithmetic processing circuit 13, a drive circuit 19, a power-supply detection circuit 15, and a current detection circuit 16. This drive control device 10 converts the power supply voltage into a DC voltage by rectifier diodes $D_1$ to $D_4$, which are connected to an AC power supply 17 in a bridge configuration, and a smoothing capacitor $C_1$, converts the DC voltage into an output voltage by transistors $Tr_1$ to $Tr_3$ serving as switching elements caused to carry out a switching operation by the drive circuit 14, and drives the electromagnetic coil 7 of the vibratory part feeder 1 by the output voltage thereof.

The voltage detection circuit 11 in the drive control device 10 is provided on a subsequent stage of the rectifier diodes $D_1$ to $D_4$ and the smoothing capacitor $C_1$, and detects the DC voltage obtained by the rectifier diodes $D_1$ to $D_4$ and the smoothing capacitor $C_1$ converting the power supply voltage input from the AC power supply 17, for example, a voltage value having a frequency of 60 Hz and an amplitude of 200 V, as a power supply voltage at a delivery destination.

A basic switching pattern in a case where the transistors $Tr_1$ to $Tr_3$ are driven at a reference voltage with respect to the power supply voltage at the delivery destination, for example, a voltage value having a frequency of 60 Hz and an amplitude of 100 V, is stored in the memory circuit 12 in advance by basic-switching-pattern setting means 18 in a production process of the vibratory part feeder 1. This basic switching pattern is a pattern in a good state or preferably an optimal state taking into account the size and the mass of the projection nut 19, the mass of the bowl 2, output characteristics of the electromagnetic coil 7, and the like according to this embodiment, and is set in the manufacturing stage so that the bowl 2 has an oscillation frequency of 75 times per second at a voltage of 95 V for an optimal feeding of approximately 200 pieces per minute in this embodiment.

The basic-switching-pattern setting means 18 provides the function of setting the oscillation frequency of 75 times per second and the voltage of 95 V for setting the amplitude as mentioned above, for example, and various forms can be employed for the basic-switching-pattern setting means 18. The following is an example thereof. A device for setting the basic switching pattern includes DC conversion means for converting the AC power supply to a DC, waveform forming means for forming a predetermined waveform from the DC, and means for setting this waveform to predetermined frequency (oscillation frequency) and amplitude. Then, oscillation frequency setting means for setting the frequency (oscillation frequency) to the predetermined value is provided so as to be adjustable, and amplitude setting means for setting the amplitude to the predetermined value is provided so as to be adjustable.

The AC power supply is AC 100 V and 60 Hz, for example, and is converted into the DC current, and is then set to proper oscillation frequency and voltage (amplitude) by the oscillation frequency setting means and the amplitude setting means. This setting is the setting of optimal values through an operation on adjustment dials or the like by an operator observing the number of fed projection nuts, and the optimal values are the oscillation frequency of 75 times per second and the voltage of AC 95 V for this part feeder as mentioned before. The values obtained in this way are stored in the memory circuit 12. This storage is carried out according to an ordinary method using a computer device or the like.

The arithmetic processing circuit 13 calculates a ratio of the detected voltage output from the voltage detection circuit 11 to the reference voltage, and then calculates, based on the ratio, a switching pattern substantially the same as the basic switching pattern under an environment of the power supply voltage unique to the delivery destination. In other words, ON/OFF timings are calculated for a switching pattern substantially the same as the basic switching pattern (oscillation frequency of 75 times per second and voltage of 95 V) in a case where the transistors $Tr_1$ to $Tr_3$ are driven at the reference voltage (voltage value having the frequency of 60 Hz and the amplitude of 100 V) by multiplying a pulse width, which represents ON/OFF timings of the basic switching pattern, by the inverse of the ratio of the detected voltage to the reference voltage as a switching pattern in a case where the transistors $Tr_1$ to $Tr_3$ are driven at the power supply voltage (voltage value having the frequency of 60 Hz and the amplitude of 200 V) at the delivery destination.

The drive circuit 14 converts the DC voltage converted by the rectifier diodes $D_1$ to $D_4$ and the smoothing capacitor $C_1$ to the output voltage by the switching of the transistors $Tr_1$ to $Tr_3$ according to a control signal based on the calculation result by the arithmetic processing circuit 13, and drives the electromagnetic coil 7 of the vibratory part feeder 1 by using the output voltage.

It should be noted that the drive control device 10 includes the power-supply detection circuit 15 provided on the input side of the AC power supply 17, and the current detection circuit 16 provided on the previous stage of the transistors $Tr_1$ to $Tr_3$.

The power-supply detection circuit 15 detects presence/absence of the power supply by the AC power supply 17 in order to restrain an inrush over current to the electromagnetic coil 7 due to the start of the power supply after a short disconnection of the power supply voltage. Moreover, the current detection circuit 16 detects the current flowing through the electromagnetic coil 7 in order to restrain an over current due to a damage or an overheat of the electromagnetic coil 7.

Figure 2:
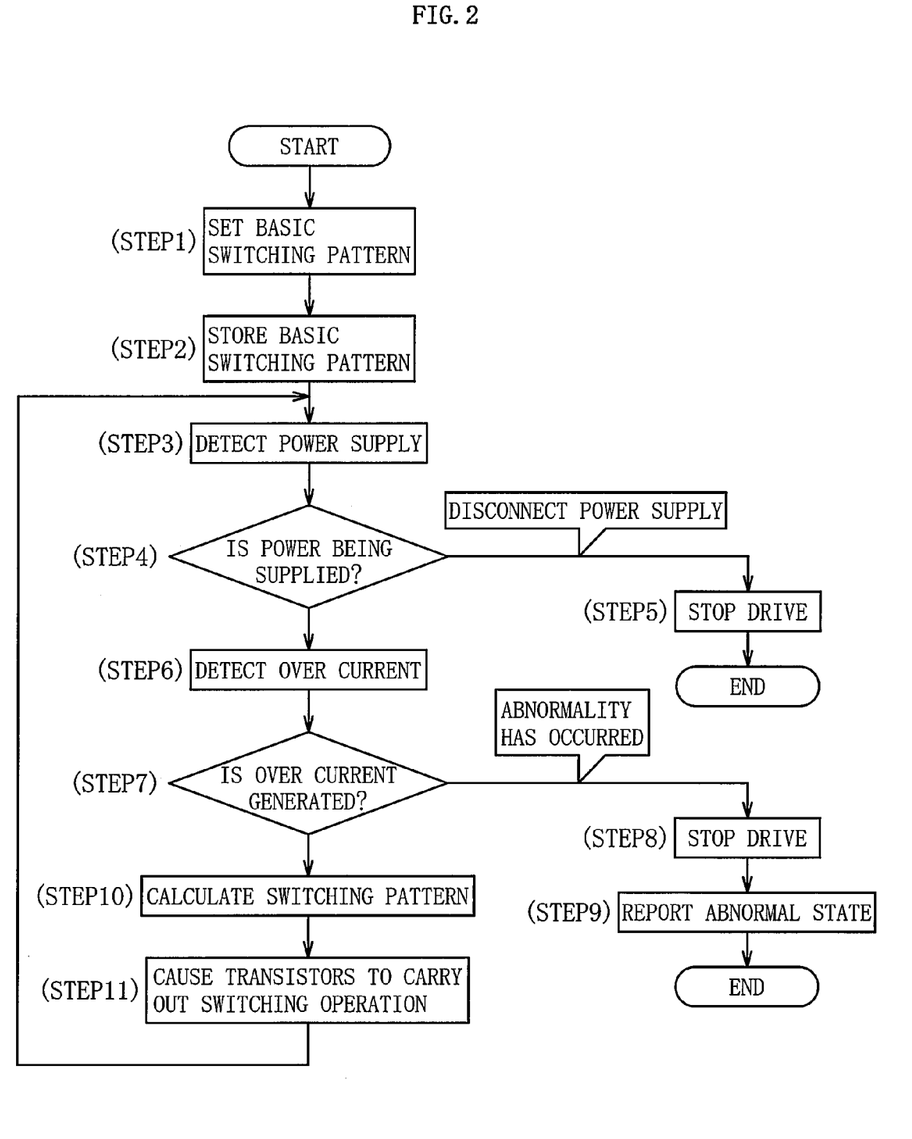
[FIG. 2] A flowchart illustrating steps of driving the vibratory part feeder.
Figure 3:
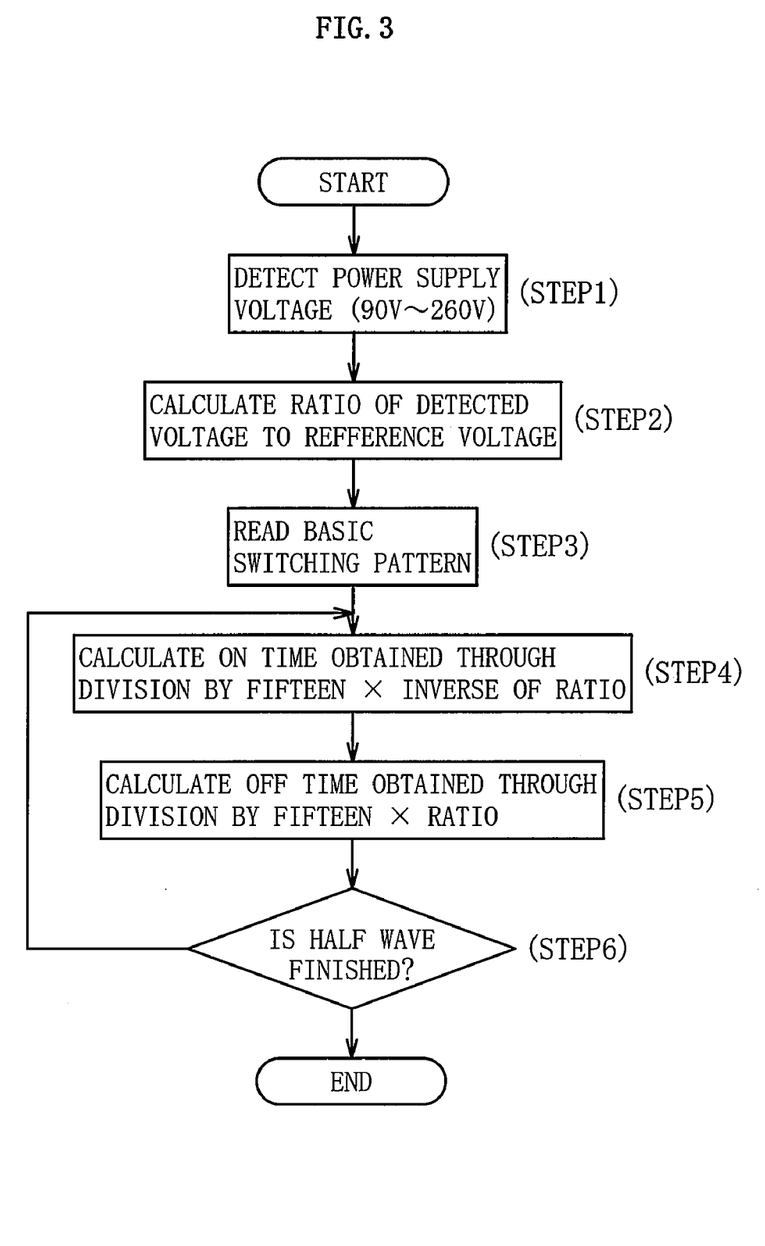
[FIG. 3] A flowchart illustrating processing steps by an arithmetic processing circuit of the drive control device.

Description is now given of an operation of the drive control device 10 including the above-mentioned circuit configuration based on flowcharts illustrated in FIGS. 2 and 3 as an example. FIG. 2 illustrates steps of driving the vibratory part feeder 1, and FIG. 3 illustrates processing steps in the arithmetic processing circuit 13 of the drive control device 10.

As illustrated in FIG. 2, first, the reference voltage for driving the electromagnetic coil 7 of the vibratory part feeder 1 at a stable, constant oscillation is arbitrarily set, and the basic switching pattern of the transistors $Tr_1$ to $Tr_3$ (ON/OFF timings of the transistors $Tr_1$ to $Tr_3$) by the drive circuit 14 in a case where the electromagnetic coil 7 is driven at the frequency of 60 Hz and the amplitude of 100 V, for example, is set by the basic-switching-pattern setting means 18 in the production process of the vibratory part feeder 1 (STEP 1), and the basic switching pattern is stored in the memory circuit 12 in advance (STEP 2). The values stored in this way are AC 95 V and 75 Hz as illustrated in FIG. 5b. The reference voltage set arbitrarily is selected from a plurality of power supply voltages unique to delivery destinations.

On this occasion, in order to restrain the inrush over current flowing to the electromagnetic coil 7 due to the start of the power supply after the short disconnection of the power supply voltage supplied by the AC power supply 17, the presence/absence of the power supply by the AC power supply 17 is detected by the power-supply detection circuit 15 (STEP 3). The arithmetic processing circuit 13 makes a determination as described below based on the output from the power-supply detection circuit 15. If the power supply by the AC power supply 17 is present (power supply is turned ON), the power supply to the electromagnetic coil 7 continues (STEP 4), and if the power supply by the AC power supply 17 is not present (power supply is turned OFF), the power supply to the electromagnetic coil 7 is disconnected, thereby stopping the drive of the vibratory part feeder 1 (STEP 5). In this way, the vibratory part feeder 1 is protected against the inrush over current to the electromagnetic coil 7.

Moreover, the current detection circuit 16 detects the current flowing through the electromagnetic coil 7 in order to restrain the over current due to the damage and the overheat of the electromagnetic coil 7 (STEP 6). The arithmetic processing circuit 13 makes a determination as described below based on the output from the current detection circuit 16. If the over current to the electromagnetic coil 7 is not generated, the power supply to the electromagnetic coil 7 continues (STEP 7), and if the over current to the electromagnetic coil 7 is generated, the power supply to the electromagnetic coil 7 is disconnected, thereby stopping the drive of the vibratory part feeder 1 (STEP 8), and reporting the abnormal state by a lamp, a buzzer, or the like (STEP 9). In this way, the vibratory part feeder 1 is protected against the over current caused by the damage or the overheat of the electromagnetic coil 7.

After it is confirmed whether or not the power supply state of the electromagnetic coil 7 is normal as described above, the drive circuit 14 causes the transistors $Tr_1$ to $Tr_3$ to carry out the switching operation, thereby driving the electromagnetic coil 7 to impart the oscillation to the part-transport unit. On this occasion, the arithmetic processing circuit 13 applies the control according to half-wave rectification to the power supply voltage from the AC power supply 17 as illustrated in FIG. 4, thereby intermittently driving the electromagnetic coil 7 by repeating an applied wave X generated by applying a half-wave voltage and a counter electromotive wave Y generated by releasing a counter electromotive force generated on the electromagnetic coil 7.

In other words, the arithmetic processing circuit 13 calculates a switching pattern which represents ON/OFF timings of the transistors $Tr_1$ to $Tr_3$ by dividing a half wave of the DC voltage rectified by the rectifier diodes $D_1$ to $D_4$ and the smoothing capacitor $C_1$ into fifteen divisions (equal divisions) ($t_1=t_2=\ldots=t_{14}=t_{15}$), for example (STEP 10), and the transistors $Tr_1$ to $Tr_3$ are caused to carry out the switching operation as described below (STEP 11).

Figure 4:
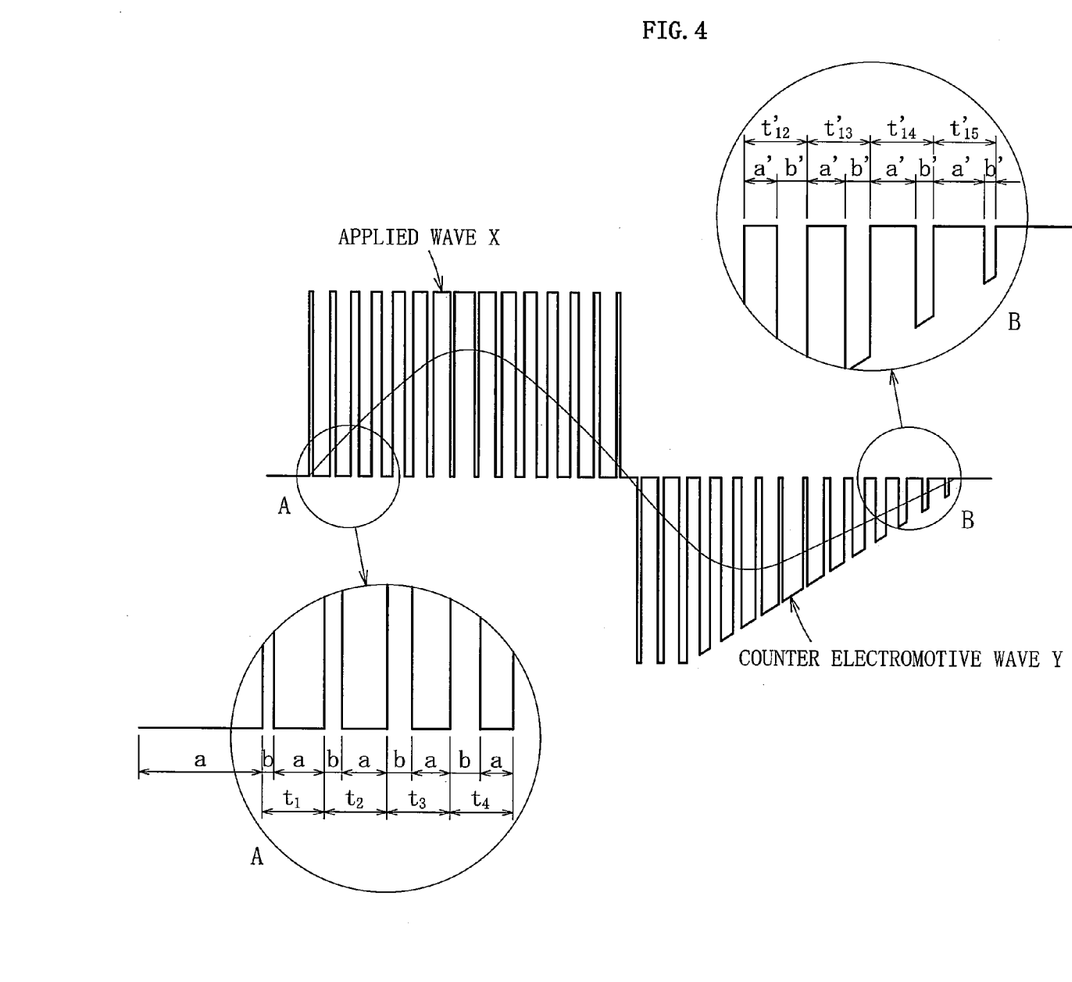
[FIG. 4] A waveform diagram illustrating an applied wave generated by applying a half-wave voltage and a counter electromotive wave generated by releasing a counter electromotive force generated on an electromagnetic coil as a result of control of a power supply voltage according to half-wave rectification.

As illustrated in an enlarged view of a portion A of FIG. 4, the transistors $Tr_1$ and $Tr_3$ (refer to FIG. 1a) are turned ON in a period b of the applied wave X for applying the voltage, and the transistors $Tr_2$ and $Tr_3$ are turned ON in a period a of the applied wave X for not applying the voltage. The period a and the period b of the applied wave X are adjusted in terms of time on this occasion. In other words, an effective sine wave (thin line of FIG. 4) is generated based on a switching pattern in which ON time (period b) or OFF time (period a) is gradually decreased or increased so that the ON time (period b) is maximum and the OFF time (period a) is minimum at the center of the fifteen divisions ($t_1=t_2=\ldots=t_{14}=t_{15}$), and the ON time (period b) is minimum and the OFF time (period a) is maximum on both end portions thereof.

In this case, the each period of the fifteen divisions ($t_1=t_2=\ldots=t_{14}=t_{15}$) may be set constant, and the ON time (period b) may be increased/decreased. It should be note that the each period of the fifteen divisions ($t_1=t_2=\ldots=t_{14}=t_{15}$) may be set constant, and the OFF time (period a) may also be increased/decreased.

As illustrated in an enlarged view of a portion B of FIG. 4, only the transistor $Tr_2$ is turned ON in a period b' of the counter electromotive wave Y for releasing the counter electromotive force, and the transistors $Tr_2$ and $Tr_3$ are turned ON in a period a' of the counter electromotive wave Y for not releasing the counter electromotive force. The period a' and the period b' of the counter electromotive wave Y are adjusted in terms of time on this occasion. In other words, the effective sine wave (thin line of FIG. 4) is generated based on a switching pattern in which the ON time (period b') or the OFF time (period a') is gradually decreased or increased so that the ON time (period b') is maximum and the OFF time (period a') is minimum at the center of the fifteen divisions ($t'_1=t'_2=\ldots=t'_{14}=t'_{15}$), and the ON time (period b') is minimum and the OFF time (period a') is maximum on both end portions thereof.

In this case, the each period of the fifteen divisions ($t_1'=t_2'=\ldots=t_{14}'=t_{15}'$) may be set constant, and the ON time (period b') may be increased/decreased. It should be noted that the each period of the fifteen divisions ($t_1'=t_2'=\ldots=t_{14}'=t_{15}'$) may be set constant, and the OFF time (period a') may also be increased/decreased.

In this way, the control according to the half-wave rectification is applied to the power supply voltage from the AC power supply 17, thereby supplying the electromagnetic coil 7 with, as the output voltage of the drive control device 10, the effective sine wave generated based on the switching pattern repeating the applied wave X generated by applying the half-wave voltage and the counter electromotive wave Y generated by releasing the counter electromotive force generated on the electromagnetic coil 7. As a result, the electromagnetic coil 7 is intermittently driven using the output voltage. The half-wave rectification of the power supply voltage can impart a stronger oscillation to the part-transport unit than control according to full-wave rectification applied to the power supply voltage, and hence power can be saved.

The drive control device 10 can cause the electromagnetic coil 7 of the vibratory part feeder 1 to always generate a constant oscillation for the predetermined voltage range (such as 90 V to 260 V) including a plurality of types of power supply voltages different in frequency and amplitude from the reference voltage (frequency of 60 Hz and amplitude of 100 V, for example) depending on the delivery destination which is the location at which the vibratory part feeder 1 is to be installed.

Figure 5A:
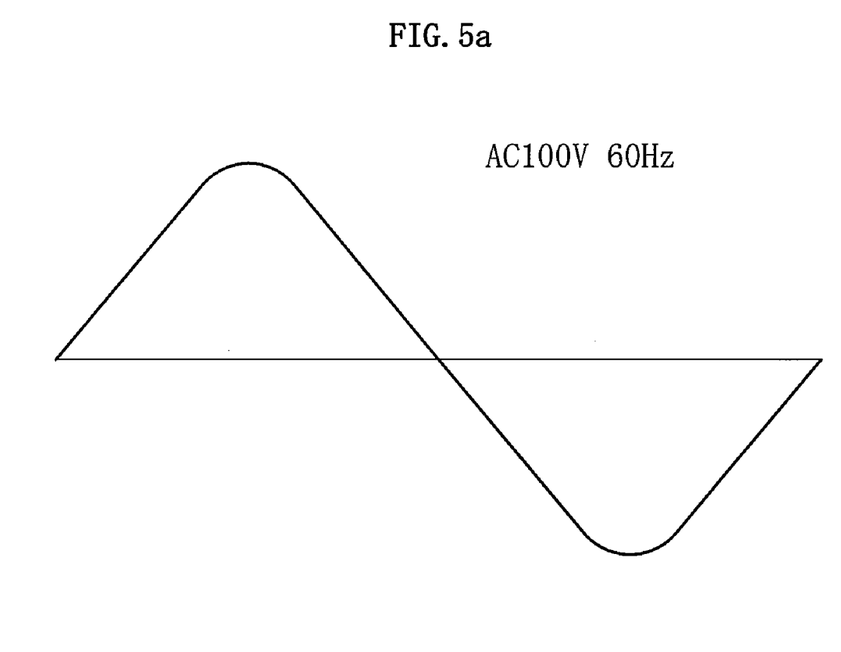
[FIG. 5a] A waveform diagram illustrating a power supply voltage serving as a reference.
Figure 5B:
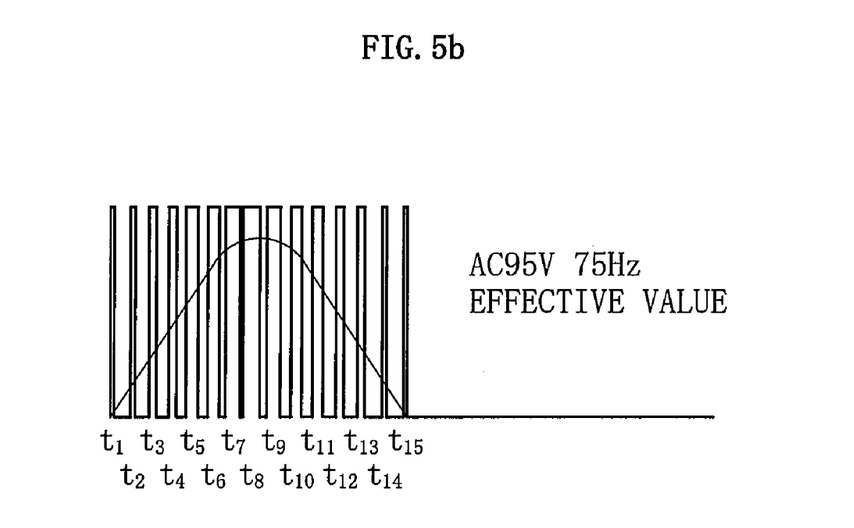
Figure 6A:
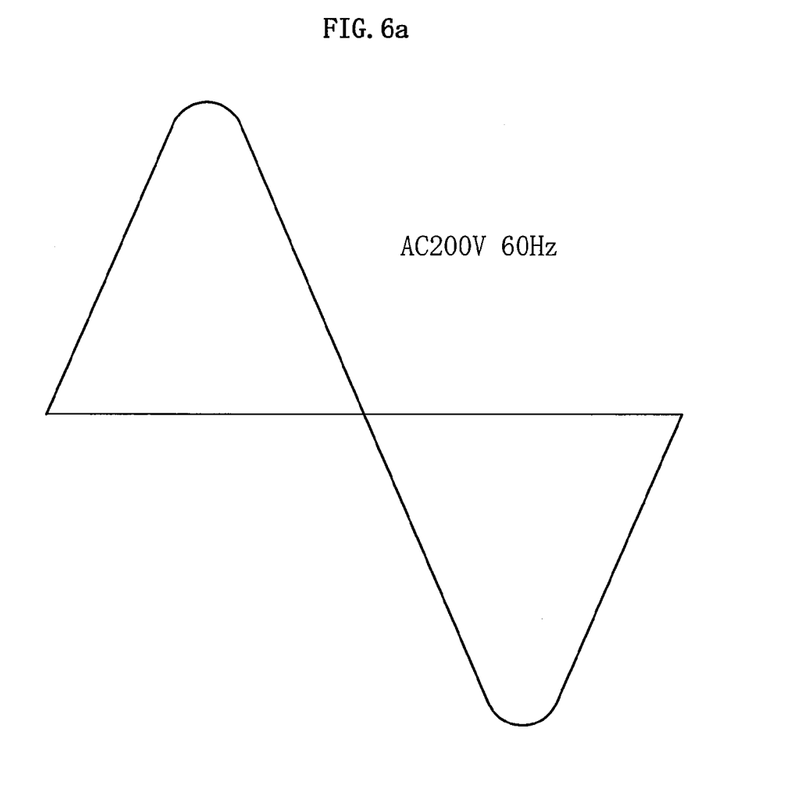
[FIG. 6a] A waveform diagram illustrating a power supply voltage at a delivery destination.

For example, FIG. 5a illustrates a reference voltage having a frequency of 60 Hz and an amplitude of 100 V as an example, and FIG. 6a illustrates a power supply voltage unique to a delivery destination having a frequency of 60 Hz, and an amplitude of 200 V as an example. In this case, the drive control device 10 detects the power supply voltage (in a case of frequency of 60 Hz and amplitude of 200 V illustrated in FIG. 6a) unique to the delivery destination of the vibratory part feeder 1 by the voltage detection circuit 11 (refer to FIG. 1a) as illustrated in FIG. 3 (STEP 1), and the arithmetic processing circuit 13 calculates the ratio of the detection voltage (power supply voltage unique to the delivery destination) output from the voltage detection circuit 11 to the reference voltage (in a case of frequency of 60 Hz and amplitude of 100 V illustrated in FIG. 5a) (the detection voltage is twice as high in amplitude as the reference voltage in this case) (STEP 2).

On this occasion, in the arithmetic processing circuit 13, as described above, the effective sine wave (thin line of FIG. 5b) is generated based on the switching pattern which represents the ON/OFF timings of the transistors $Tr_1$ to $Tr_3$, in which the half wave of the DC voltage rectified by the rectifier diodes D to $D_1$ and the smoothing capacitor $C_1$ is divided into the fifteen divisions (equal divisions), for example, and then the ON time (period b) or the OFF time (period a) is gradually decreased or increased so that the ON time (period b) is maximum and the OFF time (period a) is minimum at the center of the fifteen divisions ($t_1=t_2=\ldots=t_{14}=t_{15}$), and the ON time (period b) is minimum and the OFF time (period a) is maximum on both end portions thereof. In this case, the each period of the fifteen divisions ($t_1=t_2=\ldots=t_{14}=t_{15}$) is set constant, and the ON time (period b) is increased/decreased.

Then, the basic switching pattern (corresponding to the reference voltage) of the transistors $Tr_1$ to $Tr_3$ stored in advance in the memory circuit 12 is read from the memory circuit 12 (STEP 3), and the ON/OFF timings are calculated, based on the above-mentioned ratio, for the switching pattern substantially the same as the basic switching pattern (oscillation frequency of 75 times per second and voltage of 95 V) for driving the transistors $Tr_1$ to $Tr_3$ at the reference voltage (voltage Value having the frequency of 60 Hz and the amplitude of 100 V) by multiplying the pulse width (on period (period b)), which represents the ON/OFF timings of the basic switching pattern, by the inverse of the ratio of the detected voltage to the reference voltage as a switching pattern in a case where the transistors $Tr_1$ to $Tr_3$ are driven at the power supply voltage (voltage value having the frequency of 60 Hz and the amplitude of 200 V) at the delivery destination.

Specifically, the frequency and the amplitude of the reference voltage are 60 Hz and 100 V while the frequency and the amplitude of the power supply voltage at the delivery destination are 60 Hz and 200 V, and hence the amplitude of the power supply voltage, which is the detection voltage, is twice as high as the amplitude of the reference voltage (ratio is 2). Accordingly, the ON time obtained by dividing the half wave (refer to FIG. 5b) of the reference voltage by fifteen is multiplied by ½, which is the inverse of the ratio (STEP 4), and the OFF time is multiplied by two, which is the ratio (STEP 5). It should be noted that if the half wave is not finished (STEP 6), the above-mentioned ratio calculation is to be repeated.

Figure 6B:
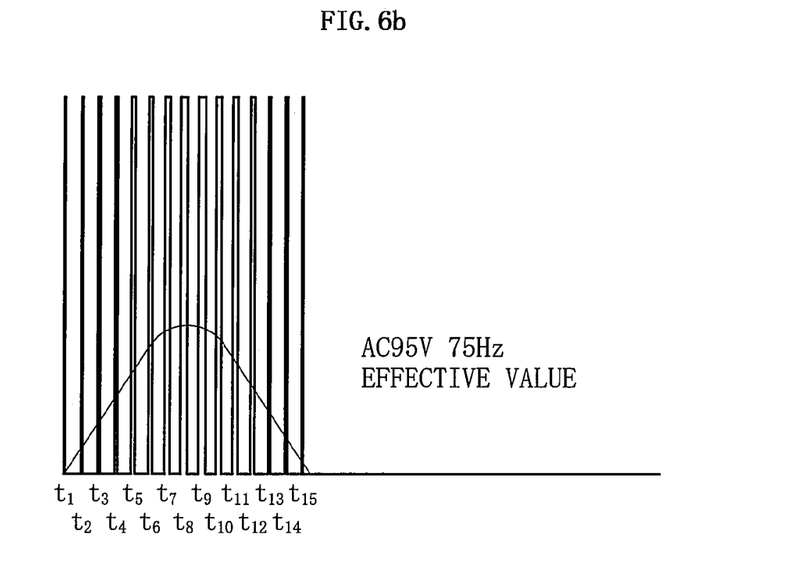

This results in a half wave of the power supply voltage in which the ON times of the half wave of the reference voltage are halved and the OFF times are doubled. In other words, the switching pattern at the delivery destination illustrated in FIG. 6b is obtained by halving the ON times of the basic switching pattern illustrated in FIG. 5b and doubling the OFF times. As a result, the effective sine wave (frequency of 75 Hz and amplitude of 95 V) based on the switching pattern for the power supply voltage at the delivery destination as illustrated by a thin line of FIG. 6b is substantially the same as the effective sine wave (frequency of 75 Hz and amplitude of 95 V) based on the basic switching pattern for the reference voltage as illustrated by the thin line of FIG. 5b.

As described above, the ON times and the OFF times obtained by diving by fifteen are changed according to the ratio of the power supply voltage to the reference voltage, thereby making the effective sine wave based on the switching pattern for the power supply voltage at the delivery destination and the effective sine wave based on the basic switching pattern for the reference voltage substantially the same. Then, the effective sine wave is supplied as the output voltage of the drive control circuit 10 to the electromagnetic coil 7 of the vibratory part feeder 1, thereby driving the electromagnetic coil 7 using the output voltage. A good or optimal, constant oscillation can always be generated by the electromagnetic coil 7 of the vibratory part feeder 1 in this way.

It should be noted that the transistors $Tr_1$ to $Tr_3$ are driven by the drive circuit 14 according to the control signal output from the arithmetic processing circuit 13 based on the output from the voltage detection circuit 11 always monitoring and detecting the power supply voltage at the delivery destination. The real-time monitoring as described above of the power supply voltage secures the generation of the always constant oscillation by the electromagnetic coil 7 of the vibratory part feeder 1, and thus enables quick adaptation to a change in power supply voltage. A proper reaction by the arithmetic processing is further provided for a slight variation in power supply voltage caused by the electric power used in a plant, and the constant oscillation can always be generated.

Further, if the vibratory part feeder 1 is put into practical use as a part feeding device, the number of projection nuts to be fed can be adapted to the number thereof to be consumed by an electrical resistance welder or the like, and a proper relationship with a subsequent process can be established, resulting in stable production management.

Example 1

The applicant carried out an experiment on the number of fed parts in response to a variation in power supply voltage, on the vibratory part feeder 1 having the following specifications.

The diameter of the bowl 2 of the vibratory part feeder 1 is 28 cm, the mass thereof is 2 kg, and the part is the projection nut 19 dimensioned as mentioned before. The above-mentioned reference voltage is AC 100 V, the frequency is 60 Hz, and the basic switching pattern stored in the memory circuit 12 is AC 95 V and 75 Hz as effective values.

The power supply voltage was increased from AC 90 V successively by 10 V each time under this condition, and the number of nuts fed from the feed-out tube 21 was measured at each of the voltages. Results thereof are as follows.
155 to 160 per minute at AC 90 V
194 to 204 per minute at AC 100 V
204 to 218 per minute at AC 110 V
200 to 202 per minute at AC 120 V
194 to 214 per minute at AC 130 V
188 to 202 per minute at AC 140 V
180 to 184 per minute at AC 180 V
170 to 206 per minute at AC 230 V
174 to 194 per minute at AC 260 V It was confirmed that those fed numbers are sufficient for a subsequent operation cycle of an electric resistance welder. It should be noted that the numbers are shown by an increment of 10 V up to AC 140 V, but subsequent numbers are close to each other and are thus shown by an increment of 30 V or more. Moreover, the projection nut 19 has the form having the projections for welding 19b formed at the four corners on one side as illustrated in FIG. 1d, thus has a front side and a rear side, and is normally transported on the part-transport path 20 in the bowl 2 while the front side is facing upward, but a situation in which the projection nut 19 is in a state in which the rear side is facing upward as a result of an oscillation and is not transported on the part-transport path 20 may occur, which causes a variation in the fed number. In other words, the variation in the fed number occurs in a case where the number of the projection nuts 19 with the front side facing upward is larger than the number of the projection nuts 19 with the rear side facing upward on the part-transport path 20, or in an opposite case thereof.

On the other hand, as a comparative example, a bowl having the same dimensions and the mass was used, the same projection nuts were used as parts, and a vibratory part feeder without the drive control circuit according to the present invention was operated. In this case, the power supply voltage is AC 100 V and 60 Hz. Results thereof are as follows.
164 to 194 per minute at AC 100 V
82 to 102 per minute at AC 90 V
100 to 120 per minute at AC 110 V The case of AC 100 V was within a proper range in terms of the fed number as shown above. However, the transport speed of the nuts was too slow at AC 90 V, resulting in an extremely decreased fed number, and the oscillation state was too strong and thus the nuts fell off from the part-transport path 20 at AC 110 V, resulting in an extremely decreased fed number. Observation of this comparative example reveals that the change in power supply voltage to AC 90 V or AC 110 V immediately causes a drastic reduction in fed number, and the vibratory part feeder fails in terms of the nut-feeding capability to the electric resistance welder due to an absence of an automatic response feature to the change in power supply voltage.

The amplitude and the frequency of the reference voltage are AC 100 V and 60 Hz. However, if the vibratory part feeder 1 was operated while connected to a power supply of AC 100 V and frequency of 50 Hz, that is, if a test was carried out assuming a case where only the frequency is different such as a difference in frequency between the Kansai area and the Kanto area in Japan, the number of nuts fed from the feed-out tube 21 was 190 to 205 per minute, which is sufficient number for the electric resistance welder in the subsequent process.

On the other hand, if the vibratory part feeder without the drive control circuit according to the present invention was operated, the number of nuts fed from the feed-out tube 21 drastically decreased to 40 to 50 per minute, which revealed an insufficient feeding capability to the electric resistance welder. The reference voltage and the power supply voltage at the delivery destination are the same in a case where the amplitude of the power supply voltage does not change and only the frequency changes as described above in the example, and hence a ratio of the reference voltage to the power supply voltage at the delivery destination is 1, and the basic switching pattern is reproduced.

The basic-switching-pattern setting means 18 is provided as a production device or a production facility for storing the basic switching pattern in the memory circuit 12 in the embodiment illustrated in FIG. 1a and the like. However, the basic-switching-pattern setting means 18 and a circuit required for the storage (such as a simplified computer device) may be built into the drive control device 10 of a vibratory part feeder or the like, which is an oscillator, the proper oscillation frequency and amplitude may be set by the built-in means 18, and then the means 18 may be made into a black box or the adjusting dial may be locked (by caulking, for example) so that the customer cannot convert those set values, thereby utilizing the purport of the present invention. The employment of this method enables maintaining a large number of vibratory part feeders along with the drive control device 10 in stock, and setting a proper basic switching pattern according to the part mass and the size of the bowl requested by the customer immediately before the delivery in an adjustment process on a delivering factory. In other words, the oscillation frequency and the amplitude can be properly set according to the request from the customer in the logistics process of the production and the delivery.

The present invention is not limited to the above-mentioned embodiment, and it is understood that the present invention may be embodied in further various forms without departing from the gist of the present invention, and the scope of the present invention is defined by claims, and includes all equivalents mentioned in the claims and all modifications within the scope.

INDUSTRIAL APPLICABILITY

As described above, according to the present invention, predetermined frequency and amplitude proper for the oscillator are automatically secured only by connecting the oscillator to the power supply even if the power supply voltage varies at the delivery destination of the oscillator, and hence it is not necessary for a customer to carry out a special adjustment operation or the like, and it is expected that the oscillator be widely used in a process for electric resistance welding of an automobile body and the like.

BRIEF DESCRIPTION OF DRAWINGS

[FIG. 1b] A plan view illustrating a part-transport path of a bowl of the vibratory part feeder of FIG. 1a.

[FIG. 5b] A waveform diagram illustrating a switching pattern based on the reference voltage illustrated in FIG. 5a.

[FIG. 6b] A waveform diagram illustrating a switching pattern based on the power supply voltage illustrated in FIG. 6a.

REFERENCE SIGNS LIST

| | |
|---|---|
| 1 | vibratory part feeder |
| 7 | oscillation generation unit (electromagnetic coil) |
| 10 | drive control device |
| 11 | voltage detection circuit |
| 12 | memory circuit |
| 13 | arithmetic processing circuit |

The invention claimed is:

1. A drive control device for an oscillator, which generates a predetermined switching pattern by operating a switching element, and supplies an oscillation generation unit of an oscillator with drive electric power for generating predetermined oscillation frequency and amplitude according to the switching pattern, the oscillator drive control device at least comprising:
   a voltage detection circuit for always monitoring and detecting a power supply voltage unique to a delivery destination of the oscillator;
   a memory circuit storing, in advance, a basic switching pattern adapted to an arbitrarily set reference voltage, and used for driving the oscillation generation unit at proper oscillation frequency and amplitude; and
   an arithmetic processing circuit for calculating a ratio of the detected voltage unique to the delivery destination detected by the voltage detection circuit to the reference voltage, and calculating a switching pattern substantially the same as the basic switching pattern under an environment of the power supply voltage unique to the delivery destination by multiplying a pulse width, which represents ON/OFF timings of the basic switching pattern, by an inverse of the ratio.

2. A drive control device for an oscillator according to claim 1, wherein the reference voltage is selected from a plurality of the power supply voltages unique to the delivery destination.

3. A drive control device for an oscillator according to claim 1, wherein the basic switching pattern is set in a production process of the oscillator drive control device.

4. A drive control device for an oscillator according to claim 1, wherein the oscillation generation unit of the oscillator comprises an electromagnetic coil.

5. A drive control device for an oscillator according to claim 4, wherein the electromagnetic coil is intermittently driven by repeating an applied wave generated by applying a half-wave voltage and a counter electromotive wave generated by releasing a counter electromotive force generated on the electromagnetic coil.

6. A drive control device for an oscillator according to claim 1, wherein the oscillator comprises a part feeding device.

7. A drive control device for an oscillator according to claim 6, wherein the part feeding device includes a part-transport path for transporting a part.

8. A drive control device for an oscillator according to claim 7, wherein the part-transport path is formed in a spiral form along an inner wall surface of a circular oscillating bowl storing the part.

9. A drive control method for an oscillator, which generates a predetermined switching pattern by operating a switching element, and supplies an oscillation generation unit of an oscillator with drive electric power for generating predetermined oscillation frequency and amplitude according to the switching pattern, the oscillator drive control method comprising:
   always monitoring, by a voltage detection circuit, a power supply voltage unique to a delivery destination of the oscillator;
   storing, in a memory circuit, in advance, a basic switching pattern adapted to an arbitrarily set reference voltage, and used for driving the oscillation generation unit at proper oscillation frequency and amplitude; and
   calculating, by an arithmetic processing circuit, a ratio of the detected voltage unique to the delivery destination detected by the voltage detection circuit to the reference voltage, and calculating, based on the ratio, a switching pattern substantially the same as the basic switching pattern under an environment of the power supply voltage unique to the delivery destination,
   wherein the calculating, by the arithmetic processing circuit, the switching pattern comprises multiplying a pulse width, which represents ON/OFF timings of the basic switching pattern, by an inverse of the ratio of the detected voltage to the reference voltage.

10. A drive control device for an oscillator according to claim 2, wherein the basic switching pattern is set in a production process of the oscillator drive control device.

11. A drive control device for an oscillator according to claim 2, wherein the oscillation generation unit of the oscillator comprises an electromagnetic coil.

12. A drive control device for an oscillator according to claim 3, wherein the oscillation generation unit of the oscillator comprises an electromagnetic coil.

13. A drive control device for an oscillator according to 2, wherein the oscillator comprises a part feeding device.

14. A drive control device for an oscillator according to 3, wherein the oscillator comprises a part feeding device.

15. A drive control device for an oscillator according to 4, wherein the oscillator comprises a part feeding device.

16. A drive control device for an oscillator according to 5, wherein the oscillator comprises a part feeding device.

17. A drive control device for an oscillator according to claim 10, wherein the oscillation generation unit of the oscillator comprises an electromagnetic coil.

18. A drive control device for an oscillator according to claim 10, wherein the oscillator comprises a part feeding device.

19. A drive control device for an oscillator according to claim 11, wherein the oscillator comprises a part feeding device.

20. A drive control device for an oscillator according to claim 12, wherein the oscillator comprises a part feeding device.

* * * * *

UNITED STATES PATENT AND TRADEMARK OFFICE
CERTIFICATE OF CORRECTION

| | | |
|---|---|---|
| PATENT NO. | : 7,965,001 B2 | Page 1 of 1 |
| APPLICATION NO. | : 12/993959 | |
| DATED | : June 21, 2011 | |
| INVENTOR(S) | : Yoshitaka Aoyama et al. | |

It is certified that error appears in the above-identified patent and that said Letters Patent is hereby corrected as shown below:

On the Title page, Title (54), line 3, and Col. 1, line 3, please change "DRIVE CONTROL DEVICE FOR OSCILLATOR, DRIVE CONTROL METHOD FOR OCILLATOR, AND MANUFACTURING METHOD FOR OSCILLATOR" to -- DRIVE CONTROL DEVICE FOR OSCILLATOR, DRIVE CONTROL METHOD FOR OSCILLATOR, AND MANUFACTURING METHOD FOR OSCILLATOR --.

Signed and Sealed this
Sixteenth Day of August, 2011

David J. Kappos
*Director of the United States Patent and Trademark Office*